United States Patent
Thigpen et al.

(10) Patent No.: US 10,428,584 B2
(45) Date of Patent: Oct. 1, 2019

(54) BIT FOR DRILLING WITH CASING OR LINER STRING AND MANUFACTURE THEREOF

(71) Applicant: VAREL INTERNATIONAL IND., L.L.C., Carrollton, TX (US)

(72) Inventors: Gary M. Thigpen, Houston, TX (US); Bruno Cuillier de Maindreville, Pau (FR); Gilles Gallego, Ibos (FR)

(73) Assignee: VAREL INTERNATIONAL IND., L.P., Carrollton, TX (US)

( * ) Notice: Subject to any disclaimer, the term of this patent is extended or adjusted under 35 U.S.C. 154(b) by 164 days.

(21) Appl. No.: 15/629,083

(22) Filed: Jun. 21, 2017

(65) Prior Publication Data
US 2018/0016847 A1   Jan. 18, 2018

Related U.S. Application Data

(60) Provisional application No. 62/361,739, filed on Jul. 13, 2016.

(51) Int. Cl.
| | |
|---|---|
| E21B 7/20 | (2006.01) |
| B23C 3/32 | (2006.01) |
| B23K 1/00 | (2006.01) |
| E21B 10/42 | (2006.01) |
| E21B 10/55 | (2006.01) |
| E21B 10/60 | (2006.01) |

(Continued)

(52) U.S. Cl.
CPC .................. *E21B 7/20* (2013.01); *B23C 3/32* (2013.01); *B23K 1/0008* (2013.01); *E21B 10/42* (2013.01); *E21B 10/55* (2013.01); *E21B 10/602* (2013.01); *E21B 17/046* (2013.01); *B23C 2222/64* (2013.01); *B23K 2101/002* (2018.08); *B23K 2103/08* (2018.08); *E21B 29/00* (2013.01); *E21B 33/14* (2013.01)

(58) Field of Classification Search
CPC .......... E21B 7/20; E21B 10/42; E21B 17/046; E21B 10/602; B23K 1/0008
See application file for complete search history.

(56) References Cited

U.S. PATENT DOCUMENTS

| | | |
|---|---|---|
| 4,226,645 A | 10/1980 | Waid |
| 5,950,742 A | 9/1999 | Caraway |

(Continued)

OTHER PUBLICATIONS

European Search Report; European Patent Application No. 17177550.5-1614 dated Nov. 15, 2017.

*Primary Examiner* — Taras P Bemko
*Assistant Examiner* — Manuel C Portocarrero

(57) ABSTRACT

A bit for drilling with a casing or liner string includes: a tubular stem made from a high strength metal or alloy; a head: having a cutting face with an inner cone, an outer shoulder, and an intermediate nose between the cone and the shoulder; attached to an end of the stem; and made from a nonferrous metal or alloy; a plurality of blades formed integrally with the head, made from the nonferrous metal or alloy, and each extending from a center of the cutting face to the shoulder; a plurality of superhard cutters mounted along each blade; a plurality of gauge pads formed integrally with the stem; and a flush joint formed between each blade and a respective gauge pad. A yield strength of the high strength metal or alloy is at least twice a yield strength of the nonferrous metal or alloy.

20 Claims, 9 Drawing Sheets

(51) Int. Cl.
*E21B 17/046* (2006.01)
*B23K 101/00* (2006.01)
*B23K 103/08* (2006.01)
*E21B 29/00* (2006.01)
*E21B 33/14* (2006.01)

(56) References Cited

U.S. PATENT DOCUMENTS

| | | | |
|---|---|---|---|
| 5,957,225 | A | 9/1999 | Sinor |
| 6,443,247 | B1 | 9/2002 | Wardley |
| 6,848,517 | B2 | 2/2005 | Wardley |
| 7,066,253 | B2 | 6/2006 | Baker |
| 7,096,982 | B2 | 8/2006 | McKay |
| 7,216,727 | B2 | 5/2007 | Wardley |
| 7,395,882 | B2 | 7/2008 | Oldham |
| 8,074,749 | B2 | 12/2011 | Twardowski |
| 8,561,729 | B2 | 10/2013 | King |
| 8,887,836 | B2 | 11/2014 | Williams |
| 8,960,332 | B2 | 2/2015 | Ugwuocha |
| 9,085,939 | B2 | 7/2015 | McClain |
| 2002/0174986 | A1* | 11/2002 | Szarka ............ E21B 33/146 166/289 |
| 2011/0209922 | A1 | 9/2011 | King |
| 2011/0259608 | A1* | 10/2011 | Oldham ............ E21B 7/20 166/381 |
| 2013/0098692 | A1 | 4/2013 | Wardley |
| 2013/0180781 | A1 | 7/2013 | Ersan |

* cited by examiner

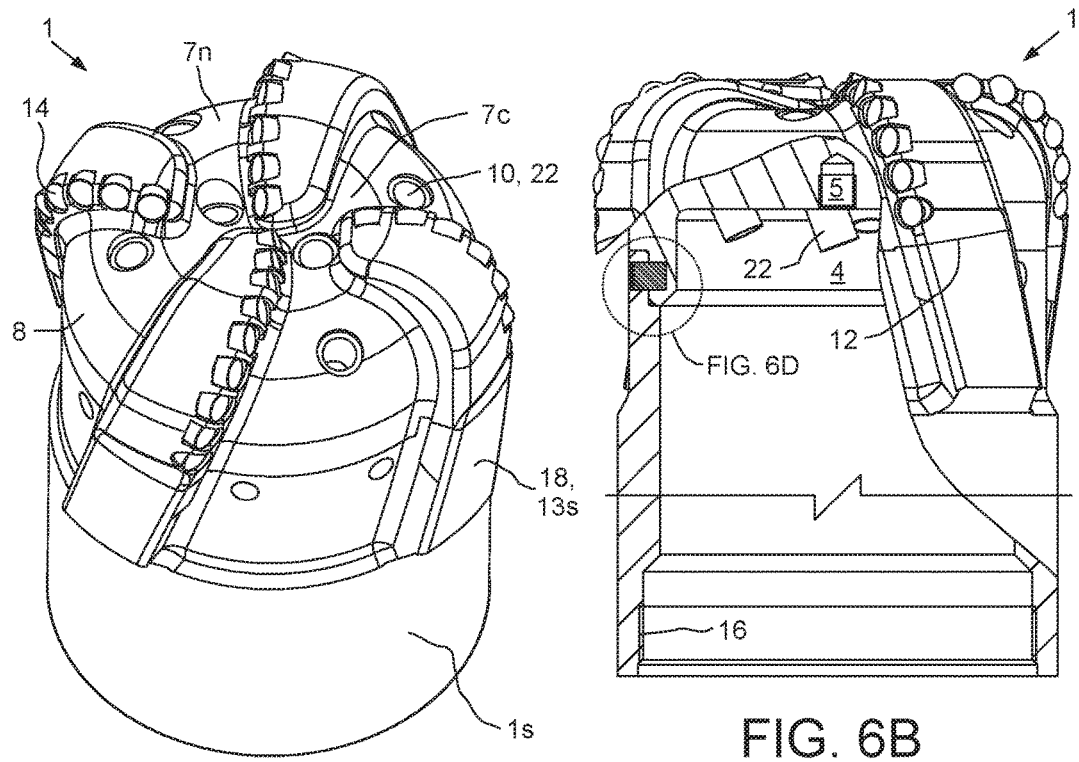
FIG. 6A
FIG. 6B
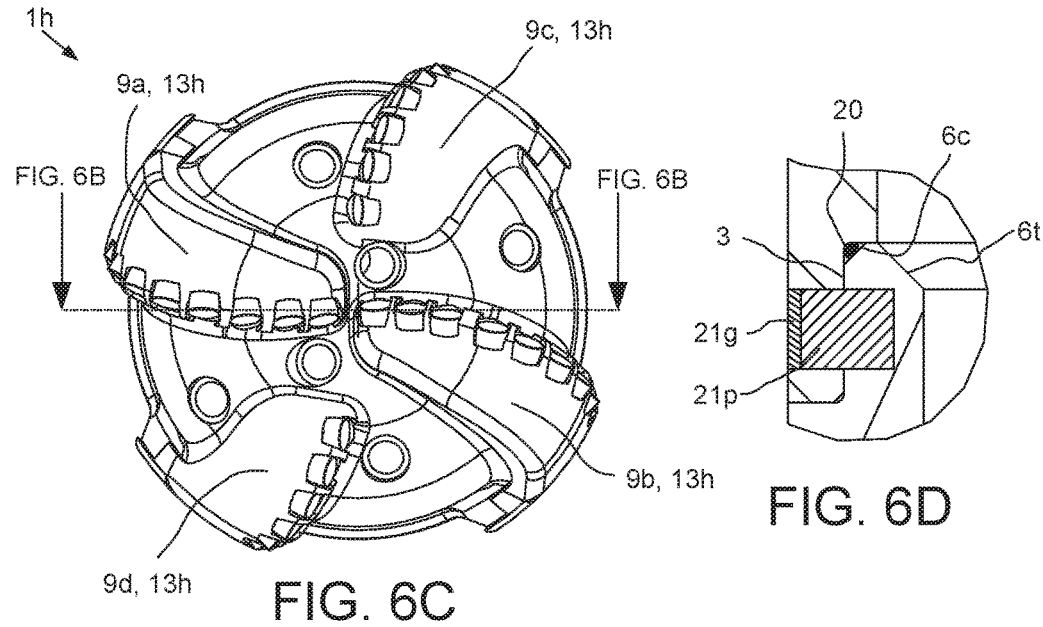
FIG. 6C
FIG. 6D

BIT FOR DRILLING WITH CASING OR LINER STRING AND MANUFACTURE THEREOF

BACKGROUND OF THE DISCLOSURE

Field of the Disclosure

The present disclosure generally relates to a bit for drilling with casing or liner string and manufacture thereof.

Description of the Related Art

U.S. Pat. No. 5,950,742 discloses methods and related equipment for drilling a wellbore in subterranean formations whereby a drill bit is attached to one end of a first conduit string, such as a casing string which is not usually used for drilling, and advancing the first conduit string and the drill bit into the subterranean formation to extend an existing wellbore, cleanout the wellbore or create a new lateral wellbore. This advancement is stopped and steps are taken to create a longitudinal opening through the drill bit. Thereafter, a second conduit string is advanced through the opening in the drill bit and into the subterranean formation to further extend, cleanout or create the lateral wellbore.

U.S. Pat. No. 5,957,225 discloses a method and liner assembly for drilling into unstable or depleted formations that maintains control of the wellbore against caving such as where unconsolidated formations are penetrated and/or minimizes fluid losses such as to underpressured formations where differential pressures exist. The method and liner assembly includes the provision of a liner having a portion thereof that is drillable so that after setting of the liner, drilling can continue deeper into the unstable formations with minimal damage to the bit used to drill out the liner drillable portion. In one form, the liner has a shoe that includes cutter mounting blades, each having a set of cutters thereon. Relief slots are formed in the blades between cutters so that as the shoe and its blades are being drilled, the drill bit will cut through the slots, releasing the shoe cutters for transport up to the surface by the drilling fluid thereby minimizing damaging contact of the bit with the shoe cutters. Preferably, the shoe has a bi-center and anti-whirl design. In another form, the liner has preassembled therewith a whipstock and a pre-formed window of drillable material adjacent the whipstock, so that after drilling into the unstable formation with the liner assembly and setting it therein, subsequent drilling beyond the liner occurs by running a drill bit downhole and drilling until it engages the whipstock that guides it to the window for drilling therethrough.

U.S. Pat. No. 6,443,247 discloses a casing drilling shoe adapted for attachment to a casing string and including an outer drilling section constructed of a relatively hard material such as steel and an inner section constructed of a readily drillable material such as aluminum. The drilling shoe further includes a device for controllably displacing the outer drilling section to enable the shoe to be drilled through using a standard drill bit and subsequently penetrated by a reduced diameter casing string or liner.

U.S. Pat. No. 6,848,517 discloses a drill bit nozzle providing a through bore for the passage of drilling fluid through a drill bit. The nozzle is made of a material or materials which can be drilled through by standard well bore drilling equipment. The material(s) are selected to provide a surface to the through bore which has a relatively high resistance to erosion to withstand the abrasive and corrosive impact of jetted drilling fluid. Embodiments are described using a hard chrome/copper combination and a single rubber material.

U.S. Pat. No. 7,066,253 discloses a shoe for guiding a string within a well-bore including an annular body of relatively hard material and a nose portion of relatively soft material which are interlocked so that when the nose portion is drilled through, any remaining parts are held against the annular body. Interlocking is achieved by a dovetail thread. Embodiments are described for the shoe as a reamer shoe and as a drill bit to run in casing.

U.S. Pat. No. 7,096,982 discloses a method and apparatus for drilling with casing including a drill shoe configured for later drilling through thereof in situ, with cutters retainable thereon in response to the forces encountered during borehole drilling, yet moveable from the envelope through which the later drill shoe will pass when cutting through the in situ drill shoe. The drill shoe includes one or more profiles thereon, into which blades carrying the formation drilling cutters are disposed. The profiles include at least one projection thereon, which is received within a mating slot in the blades. The blades also may be configured to have opposed sections which are configured with respect to one another to have an included angle of less than ninety degrees.

U.S. Pat. No. 7,216,727 discloses a drill bit for drilling casing in a well bore. The drill bit is constructed from a combination of relatively soft and relatively hard materials. The proportions of the materials are selected such that the drill bit provides suitable cutting and boring of the well bore while being able to be drilled through by a subsequent drill bit. Methods of applying hard materials to a soft material body are provided.

U.S. Pat. No. 7,395,882 discloses a casing bit, which may include a composite structure, for drilling a casing section into a subterranean formation, and which may include a portion configured to be drilled therethrough. Cutting elements and methods of use are disclosed. Adhesive, solder, electrically disbonding material, and braze affixation of a cutting element are disclosed. Differing abrasive material amount, characteristics, and size of cutting elements are disclosed. Telescoping casing sections and bits are disclosed. Aspects and embodiments are disclosed including: at least one gage section extending from the nose portion, at least one rotationally trailing groove formed in at least one of the plurality of blades, a movable blade, a leading face comprising superabrasive material, at least one of a drilling fluid nozzle and a sleeve, grooves for preferential failure, at least one rolling cone affixed to the nose portion, at least one sensor, discrete cutting element retention structures, and percussion inserts.

U.S. Pat. No. 8,074,749 discloses an earth removal member with features for facilitating drill-through. In one embodiment, an earth removal member for drilling a wellbore with casing or liner includes a tubular body and a head. The head is fastened to or formed with an end of the body, has a face and a side, is made from a high strength material, and has a port formed through the face. The earth removal member further includes a blade. The blade is formed on the head, extends from the side and along the face, and is made from the high strength material. The earth removal member further includes cutters disposed along the blade; and a nozzle adapter. The nozzle adapter has a port formed therethrough, is longitudinally and rotationally coupled to the head, and is made from a drillable material. The earth removal member further includes a nozzle disposed in the adapter port and fastened to the nozzle adapter.

U.S. Pat. No. 8,561,729 discloses a casing end tool having a bowl-like (or cup-like) body defined by a wall having an outer convex surface and an inner concave surface opposite of the outer convex surface. The bowl-like body has a center axis. The inner concave surface is non-axisymmetric with respect to the center axis, while the outer convex surface is axisymmetric with respect to the center axis. The non-axisymmetric configuration is provided in one implementation through the presence of a set of raised boss or land structures formed on the inner concave surface. In another implementation, the non-axisymmetric configuration is provided by channels formed in the inner concave surface.

U.S. Pat. No. 8,887,836 discloses wellbore cleaning bits including a bit body, at least one cutting structure on the bit body, and a shank configured to attach the bit body to a drill string. Drilling systems for cleaning wellbores include a wellbore cleaning bit coupled to a drill string. The wellbore cleaning bit may include a casing bit body and a shank attached to the casing bit body and the drill string. A casing bit may be attached to a shank having a connection portion configured for attachment to a drill string to form wellbore cleaning bits for cleaning at least a section of a wellbore. Furthermore, a casing bit may be advanced into a wellbore using a drill string to clean a wellbore.

U.S. Pat. No. 8,960,332 discloses an earth removal member with features for facilitating drill-through for drilling with casing or liner applications. In one embodiment, the casing bit includes a tubular body; a nose attached to one end of the tubular body, wherein the nose includes a blade support and comprises a drillable material; a blade attached to the blade support using mating profiles; cutters disposed along the blade; and a nozzle disposed in the nose.

U.S. Pat. No. 9,085,939 discloses casing bits including a bit crown having a substantially hollow interior. The bit crown has blades over a face portion thereof, the blades including a plurality of cutting elements attached thereto. The bit crown further includes a composite inlay positioned at least within the substantially hollow interior. The casing bits also include case hardened outer surfaces radially outside a drill-out region. The casing bits further include short-substrate cutting elements. Methods of forming a casing bit are also disclosed.

US 2011/0209922 discloses a casing end tool having a mandrel and a body that is defined by a wall having an outer surface and an inner surface opposite of the outer surface. The body is fabricated from crystalline tungsten powder and a binder material. The inner surface includes a set of raised bosses or land structures. The body includes a plurality of blades on the outer surface. Each blade has a plurality of cutters. Blade channels and cutter channels on the blades enhance fragmentation of the body during drill out of the casing end tool.

SUMMARY OF THE DISCLOSURE

The present disclosure generally relates to a bit for drilling with casing or liner string and manufacture thereof.

In one embodiment, a bit for drilling with a casing or liner string includes: a tubular stem made from a high strength metal or alloy; a head: having a cutting face with an inner cone, an outer shoulder, and an intermediate nose between the cone and the shoulder; attached to an end of the stem; and made from a nonferrous metal or alloy; a plurality of blades formed integrally with the head, made from the nonferrous metal or alloy, and each extending from a center of the cutting face to the shoulder; a plurality of superhard cutters mounted along each blade; a plurality of gauge pads formed integrally with the stem; and a flush joint formed between each blade and a respective gauge pad. A yield strength of the high strength metal or alloy is at least twice a yield strength of the nonferrous metal or alloy.

In another embodiment, a bit for drilling with a casing or liner string, includes a head having a cutting face with an inner cone and an intermediate nose and made from a nonferrous metal or alloy; a tubular stem attached to the head, having an outer shoulder of the cutting face, and made from a high strength metal or alloy; a plurality of inner blades formed integrally with the head, made from the nonferrous metal or alloy, and each extending from a center of the cutting face to the nose; a plurality of superhard cutters mounted along each inner blade; a plurality of outer blades formed integrally with the stem, made from the high strength metal or alloy, and each having a curved shoulder portion and a gage portion; a plurality of superhard cutters mounted along each shoulder portion; and a flush joint formed between each inner and outer blade. A yield strength of the high strength metal or alloy is at least twice a yield strength of the nonferrous metal or alloy.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 6A-6D illustrate the completed drill bit.

DETAILED DESCRIPTION

Figure 1A:
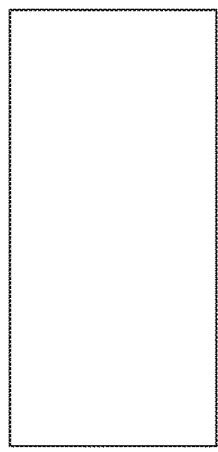
FIGS. 1A-1I illustrate manufacture of a head of a bit for drilling with a casing or liner string, according to one embodiment of the present disclosure.

FIGS. 1A-1I illustrate manufacture of a head 1h of a bit 1 (FIG. 6A) for drilling with a casing or liner string (not shown), according to one embodiment of the present disclosure. Referring specifically to FIG. 1A, a piece of round stock 2 may be received from a metalworking plant. The round stock 2 may be made from a metal or alloy. The metal or alloy may be nonferrous, such as nickel-based. The nickel-based alloy may be a nickel-copper alloy having a nickel content ranging between fifty-five and seventy-five percent and having a copper content ranging between twenty-five and forty-five percent.

Figure 1B:
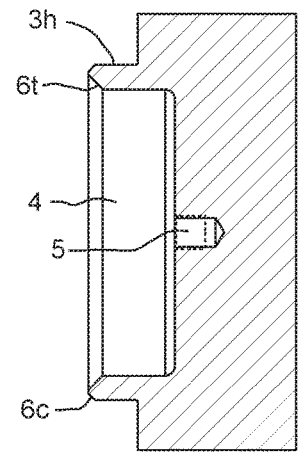
Figure 1C:
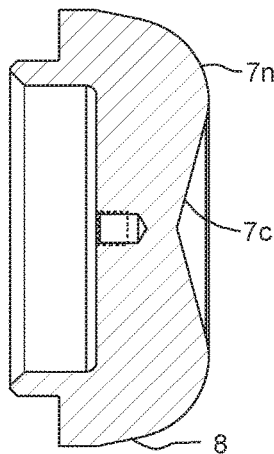
Figure 1D:
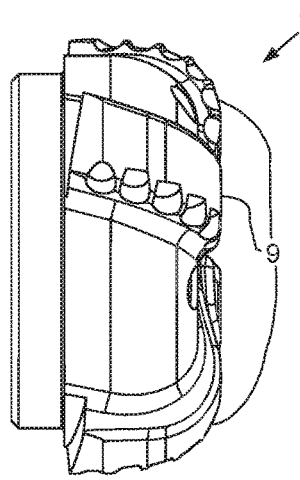
Figure 1E:
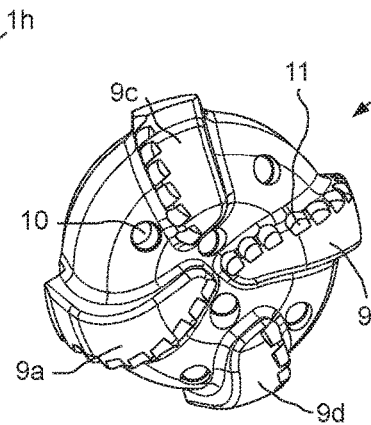
Figure 1F:
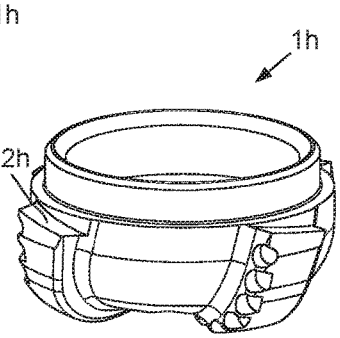
Figure 1G:
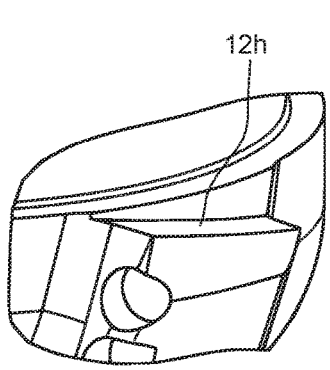

Referring specifically to FIGS. 1B and 1C, the round stock 2 may be mounted in a lathe (not shown). The lathe may be manual or CNC. The round stock 2 may be turned in the lathe to form a lap coupling 3h in an outer surface thereof at a mounting end thereof. The round stock 2 may be further turned in the lathe to form a plenum 4 extending from the mounting end and a threaded socket 5 extending from the plenum. The round stock 2 may be further turned in the lathe to form a taper 6t in an inner surface thereof adjacent to the mounting end and a chamfer 6c in an outer surface thereof adjacent to the mounting end. The round stock 2 may be further turned in the lathe to form an inner cone 7c in a cutting face thereof, an outer shoulder 8 in the cutting face, and an intermediate nose 7n between the cone and the shoulder. The cutting face may be located at an end of the round stock 2 opposite to the mounting end. The round stock with the turned features 3-8 will now be referred to as a blank.

Referring specifically to FIGS. 1D-1G, the blank may be removed from the lathe and mounted in a mill (not shown) for forming the head 1h from the blank. The mill may be manual or CNC. The mill may be operated to cut fluid courses in the cutting face of the blank, thereby forming a plurality of blades 9 between adjacent fluid courses. The mill may be further operated to drill a plurality of (six shown) ports 10 into the blank. The ports 10 may extend from the fluid courses and to the plenum 4 of the blank.

The blades 9 may include one or more (pair shown) primary blades 9a,b and one or more (pair shown) secondary blades 9c,d. The blades 9 may be spaced around the cutting face and may protrude from a bottom and side of the head 1h. The primary blades 9a,b may each extend from a center of the cutting face to the shoulder 8. The primary blades 9a,b may extend generally radially along the cone 7c and nose 7n with a slight spiral curvature and generally longitudinally along the shoulder 8 with a slight helical curvature. One or more (pair shown) of the ports 10 (inner ports) may be disposed adjacent to the center of the cutting face. The secondary blades 9c,d may each extend from a location on the cutting face adjacent to a respective inner port 10 to the shoulder 8. The secondary blades 9c,d may extend generally radially along the nose 7n with a slight spiral curvature and generally longitudinally along the shoulder 8 with a slight helical curvature. Since the blades 9 are formed integrally with the head 1h, the blades are also made from the same material as the head.

The mill may be further operated to cut a row of pockets 11 along a leading edge of each blade 9a-d. For the primary blades 9a,b, each row of pockets 11 may extend from the center of the cutting face to a shoulder end of the respective blade. For the secondary blades 9c,d, each row of pockets 11 may extend from the location adjacent to the respective inner port to a shoulder end of the respective blade. The mill may be further operated to form a curved cut 12h in the shoulder end of each blade 9a-d. The curved cuts 12h may conform to the slight helical curvature of the blades 9.

Figure 1H:
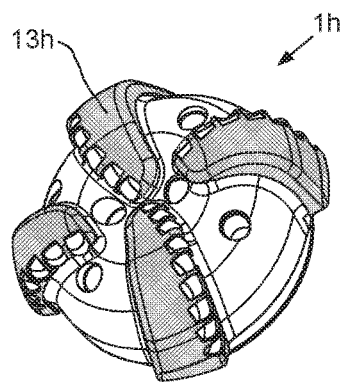

Referring specifically to FIG. 1H, the head 1h may be removed from the mill and delivered to a treatment station (not shown). The treatment station may be manual or automated. At the treatment station, a layer of hardfacing 13h may be deposited on the blades 9 to increase resistance thereof to abrasion and/or erosion. The hardfacing 13h may be ceramic or cermet, such as a carbide or carbide cemented by metal or alloy. The hardfacing 13h may be deposited on a portion of a leading face, a portion of a trailing face, and a bottom/outer surface of each blade 9a-d. The hardfaced portions of the leading and trailing faces may extend from the leading and trailing edges of each blade 9a-d to or past mid-portions thereof. The pockets 11 may be masked from the hardfacing 13h.

Figure 1I:
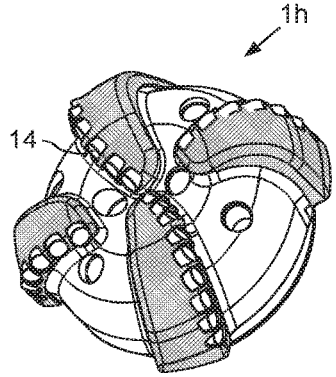

Referring specifically to FIG. 1I, the head 1h may then be transported from the treatment station to a cutter station. The cutter station may be manual or automated. At the cutter station, cutters 14 may be mounted into the pockets 11, such as by brazing. Each cutter 14 may include a superhard cutting table, such as polycrystalline diamond, attached to a hard substrate, such as a cermet, thereby forming a compact, such as a polycrystalline diamond compact (PDC). The cermet may be a carbide cemented by a Group VIIIB metal.

Figure 2A:
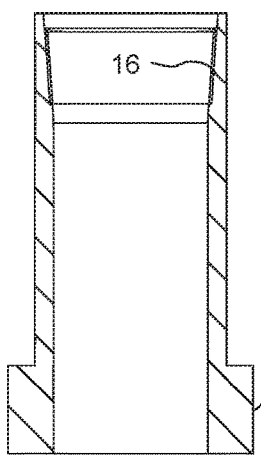
FIGS. 2A-2H illustrate manufacture of a stem of the drill bit.
Figure 2B:
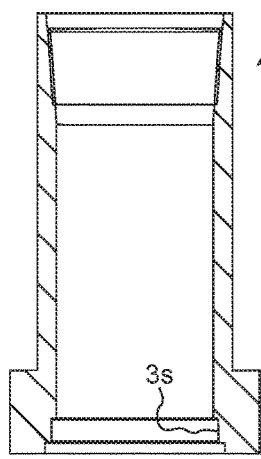
Figure 2C:
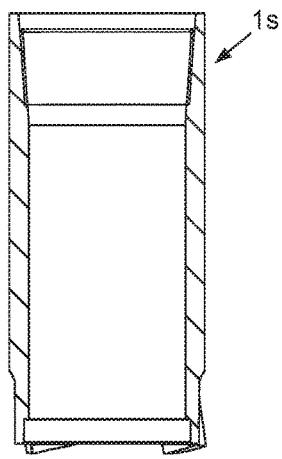
Figure 2D:
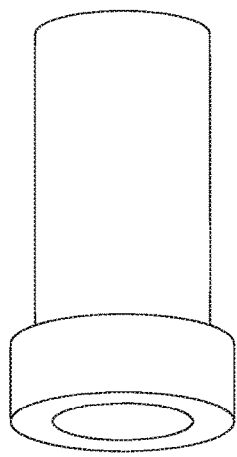

FIGS. 2A-2H illustrate manufacture of a stem 1s of the drill bit 1. Referring specifically to FIGS. 2A and 2D, an oilfield tubular 15 may be received from a manufacturing plant. The tubular 15 may have a threaded coupling 16, such as a box, formed at a first longitudinal end thereof for assembly of the drill bit 1 as part of a casing or liner string. The tubular 15 may also have a collar 17 formed in an outer surface thereof and at a second longitudinal end thereof. The collar 17 may only extend along a portion of a length of the tubular, such as between one-tenth and one-half the length of the tubular. The tubular 15 may be made from a metal or alloy that is stronger than the head alloy, such as having a yield strength greater than or equal to two, two and a half, or three times the yield strength of the head alloy. The metal or alloy of the tubular 15 may be high strength, such as steel. The steel of the tubular 15 may be plain carbon, stainless, or low alloy, such as SAE 41xx steel.

Figure 2E:
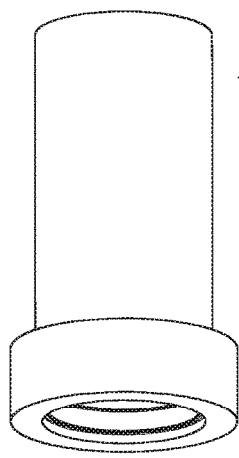

Referring specifically to FIGS. 2B and 2E, the tubular 15 may be mounted in the lathe. The tubular 15 may be turned in the lathe to form a lap coupling 3s in an inner surface thereof at the second end thereof. The lap coupling 3s may receive the lap coupling 3h to form a lap joint 3 (FIG. 3B). The tubular 15 may be further turned to adjust the length of the collar 17.

Figure 2F:
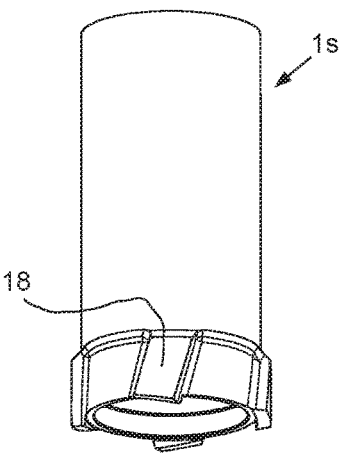
Figure 2G:
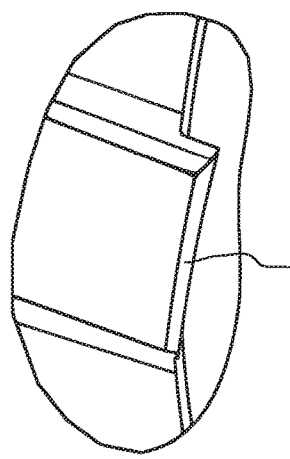

Referring specifically to FIGS. 2C, 2F, and 2G, the tubular 15 may be removed from the lathe and mounted in the mill for forming the stem 1s therefrom. The mill may be operated to cut junk slots in the collar 17, thereby forming a plurality of gauge pads 18 between adjacent junk slots. Each gauge pad 18 may match a respective blade 9a-d of the head 1h and each junk slot may match a respective fluid course of the head, thereby defining a gauge section of the drill bit 1. The gauge pads 18 may extend along the collar 17 generally longitudinally with a slight helical curvature. The mill may be further operated to form a curved cut 12s in an end of each pad 18 adjacent to the second end of the stem 1s. The curved cuts 12h may conform to the slight helical curvature of the gauge pads 18. The curved cuts 12h may receive the curved cuts 12s to form flush joints 12 (FIG. 6B). Since the gauge pads 18 are formed integrally with the stem 1s, the gauge pads 18 are also made from the same material as the stem.

Alternatively, the mill may be further operated to form pockets along and across the outer surface of the gauge pads 18.

Figure 2H:
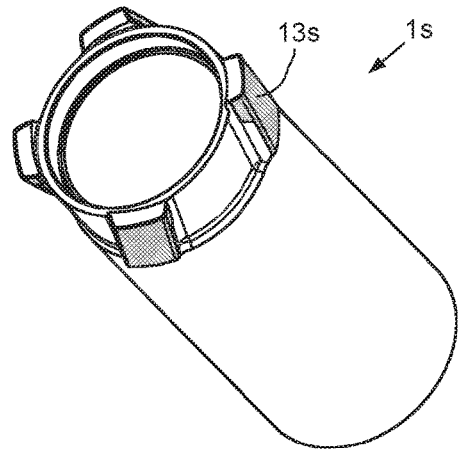

Referring specifically to FIG. 2H, the stem 1s may be removed from the mill and delivered to the treatment station. At the treatment station, a layer of hardfacing 13s may be deposited on the gauge pads 18 to increase resistance thereof to abrasion and/or erosion. The hardfacing 13s may be ceramic or cermet, such as a carbide or carbide cemented by metal or alloy. The hardfacing 13s may be deposited on a portion of a leading face, a portion of a trailing face, and an outer surface of each pad 18.

Alternatively, the stem 1s may be transported to the cutter station for the mounting of protectors in the pockets. The protectors may be made from a hard material, such as a ceramic or cermet, or a superhard material, such as diamond. The ceramic or cermet may be a carbide cemented by a metal or alloy and the diamond may be a compact or impregnated segment.

Figure 3A:
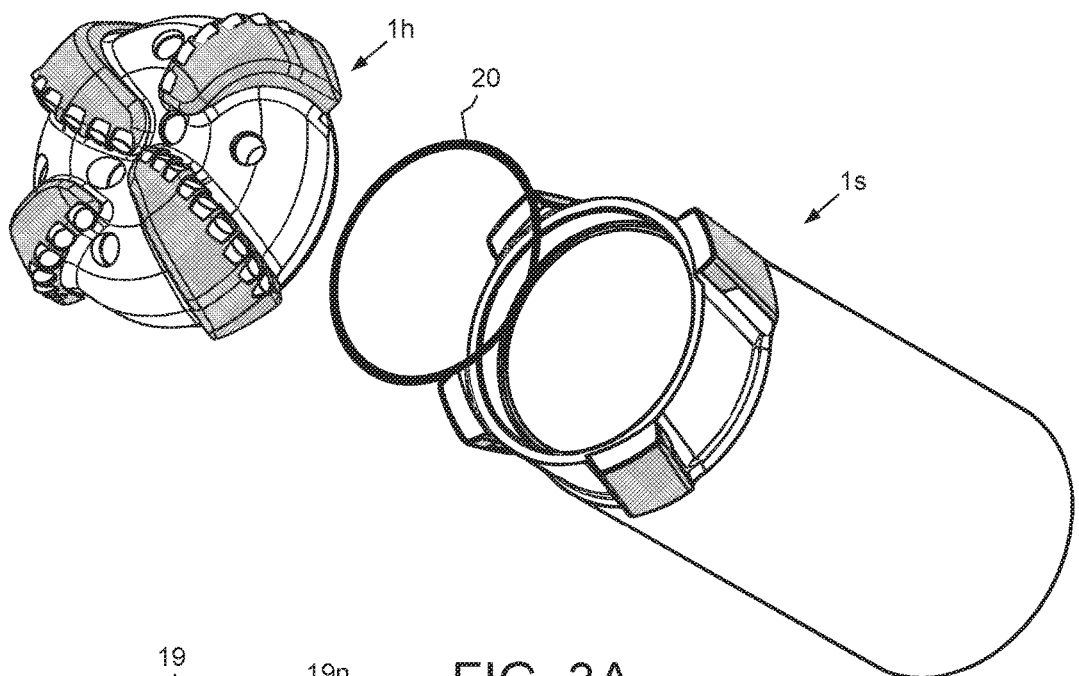
FIGS. 3A-3C illustrate assembly of the head and the stem.
Figure 3B:
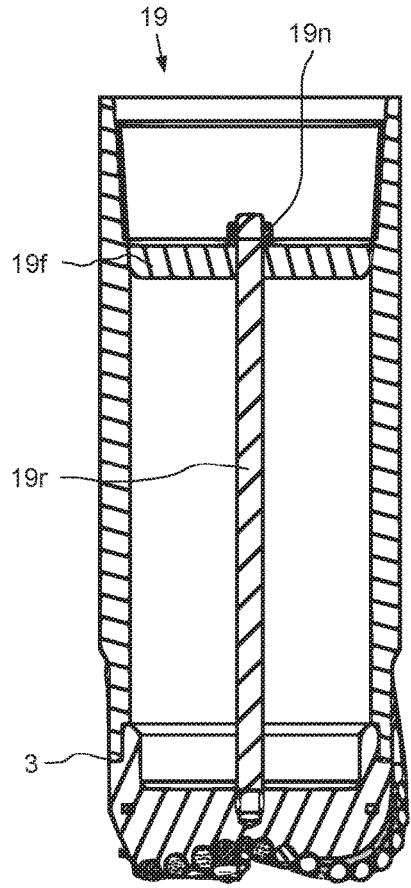
Figure 3C:
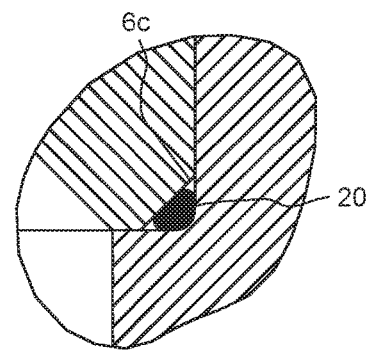
Figure 4A:
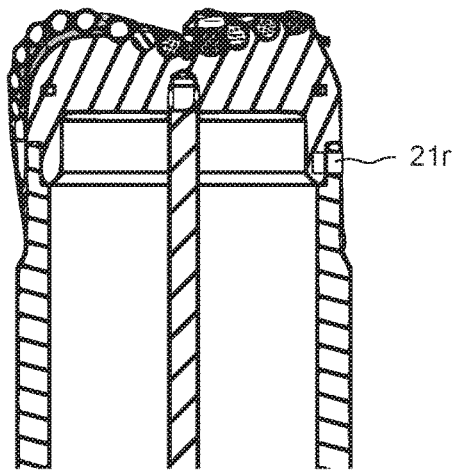
FIGS. 4A-4F illustrate manufacture of a lock joint attaching the head and the stem.
Figure 4B:
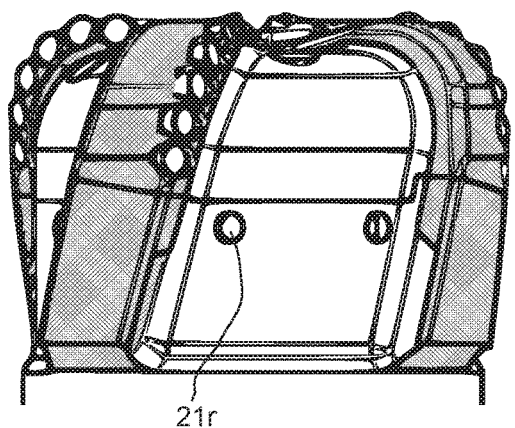
Figure 4C:
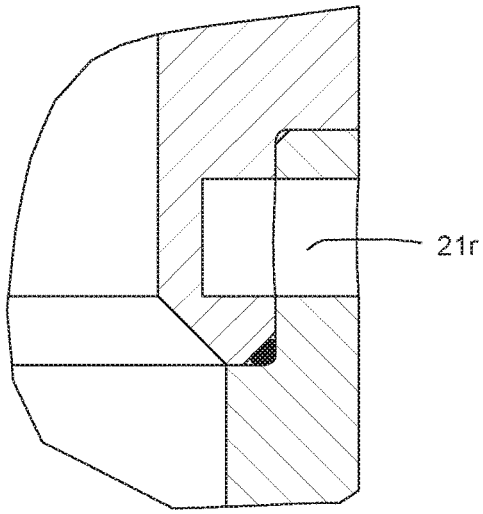
Figure 4D:
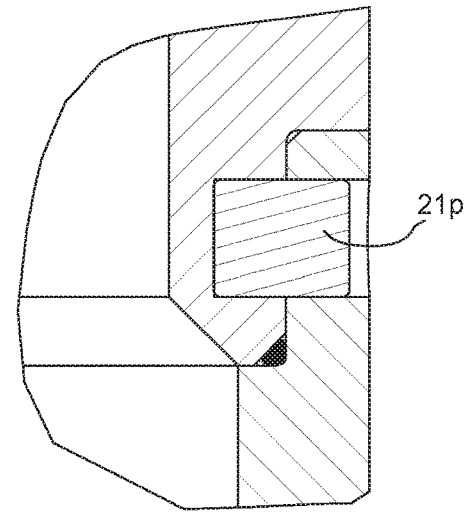
Figure 4E:
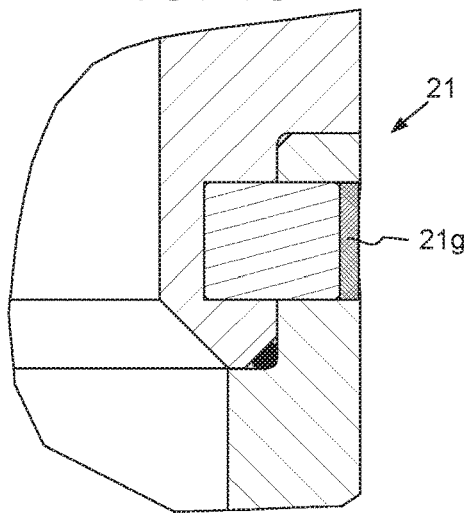
Figure 4F:
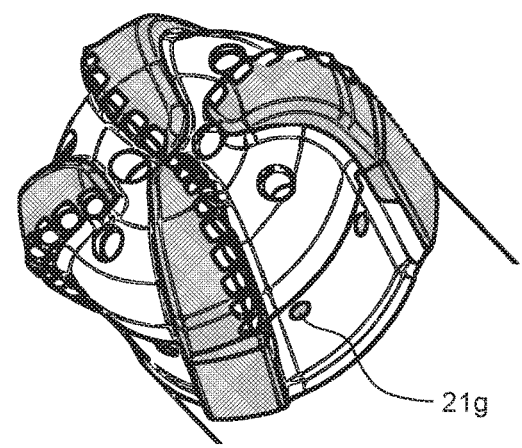

FIGS. 3A-3C illustrate assembly of the head 1h and the stem 1s. A clamp 19 may be used to facilitate the assembling process. The clamp 19 may include a flange 19f, a threaded rod 19r, and a nut 19n. The threaded rod 19r may be screwed into the socket 5 of the head 1h and the flange 19f may be screwed into the box 16 of the stem 1s. A seal 20, such as an o-ring, may be inserted into the lap coupling 3s of the stem 1s. The rod 19r may be inserted into the stem 1s and received into a hole formed through the flange 19f as the lap couplings 3h,s are mated and the curved cuts 12h,s are aligned. The nut 19n may be screwed onto an end of the threaded rod 19r adjacent to the flange 19f, thereby securing the head 1h into place. The seal 20 may be made from an elastomeric material and may be energized by engagement of the chamfer 6c therewith.

FIGS. 4A-4F illustrate manufacture of a lock joint 21 attaching the head 1h and the stem 1s. The clamped head 1h and stem 1s may be mounted in the mill for forming the lock joint 21. The mill may be operated to drill one or more (four shown) receptacles 21r through the lap coupling 3s of the stem 1s and into the lap coupling 3h of the head 1h. A fastener, such as pin 21p, may then be inserted into each receptacle 21r and have a portion extending into a head socket of the respective receptacle and a portion extending into a stem hole of the respective receptacle, thereby torsionally and longitudinally connecting the head 1h and the stem 1s. Each pin 21p may be made from the same material as the head 1h. Each receptacle 21r may then be closed by a plug 21g formed by welding, thereby securing the respective pin 21p into place and sealing the receptacle from leakage. The clamp 19 may then be removed.

Figure 5A:
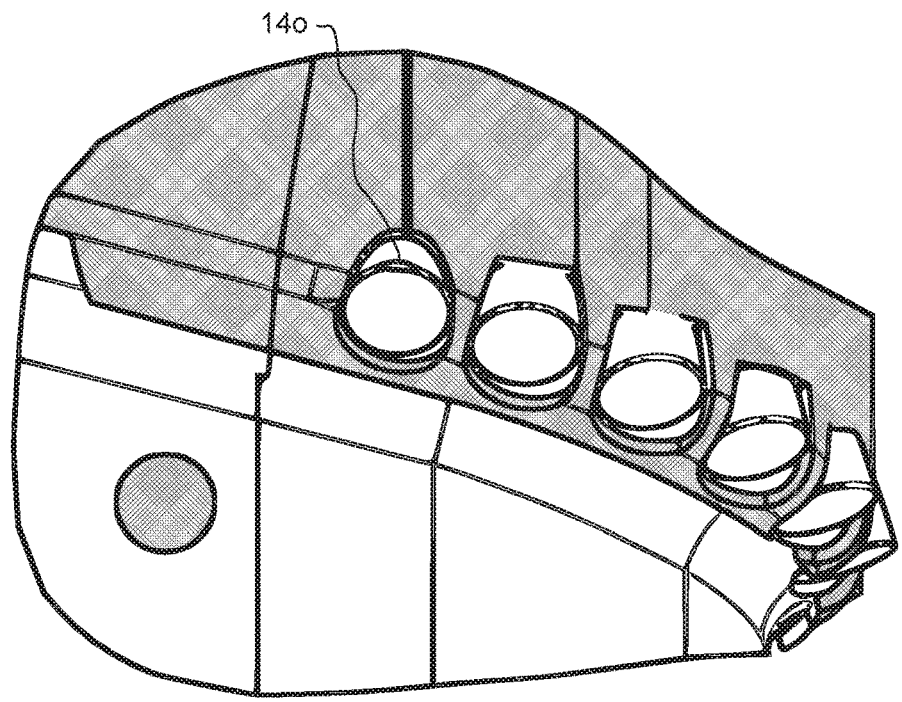
FIG. 5A illustrates adjustment of a gauge diameter of the drill bit.

FIG. 5A illustrates adjustment of a gauge diameter of the drill bit 1. A grinder (not shown) may then be used to grind down an outermost cutter 14o of each blade 9a-d to adjust the gauge diameter of the drill bit 1.

Figure 5B:
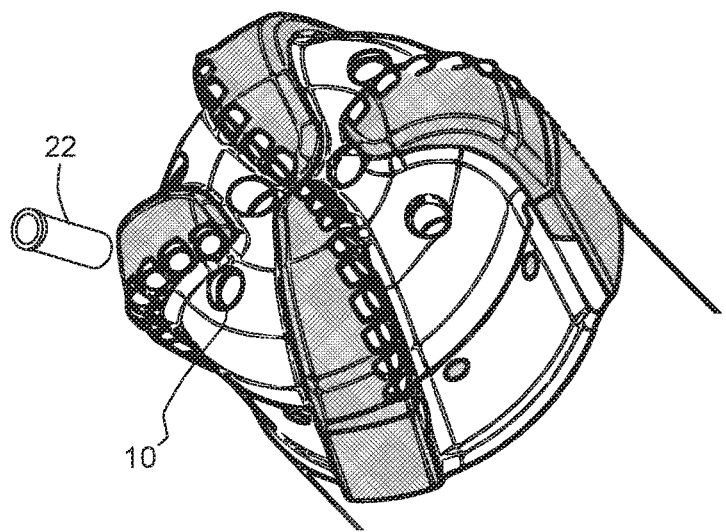
FIG. 5B illustrates installation of nozzles into the head.

FIG. 5B illustrates installation of nozzles 22 into the head 1h. A nozzle 22 may then be inserted into each port 10 and mounted therein, such as by adhesive. Each nozzle may be made from an erosion resistant material, such as a ceramic or cermet. The ceramic or cermet may be a carbide or carbide cemented by a metal or alloy. The adhesive may be a polymer, such as a thermoset. Each nozzle 22 may be a sleeve and have a mounting shoulder formed in an outer surface thereof for engagement with a mounting shoulder formed in the respective port 10. Each nozzle 22 may have a length greater than a thickness of the head 1h (between the plenum 4 and a bottom of the head) so that a portion of the nozzle extends into the plenum 4 (FIG. 6B), thereby discouraging erosion thereof.

FIGS. 6A-6D illustrate the completed drill bit 1. In operation, the drill bit 1 may be assembled as part of a liner string (not shown). The liner string may include a hanger, a packer, joints of liner, a float collar, and the drill bit 1 connected at the bottom thereof. The drill bit 1 may be especially useful for extending a wellbore through a problem, such as unstable or depleted, formation. The assembled liner string may be deployed into the wellbore using a work string connected thereto until the drill bit 1 reaches the shoe of a casing string already set in the wellbore. Drilling fluid, such as mud, may be pumped through the work string and liner string and the drill bit 1 rotated and advanced to drill out the casing shoe. Advancement of the liner string may continue until the drill bit 1 has extended the wellbore through the problem formation. The liner hanger may then be set against the casing string. Cement slurry may be pumped through the liner string and into an annulus formed between the liner string and the wellbore. The liner packer may then be set and the work string retrieved from the wellbore.

Figure 7A:
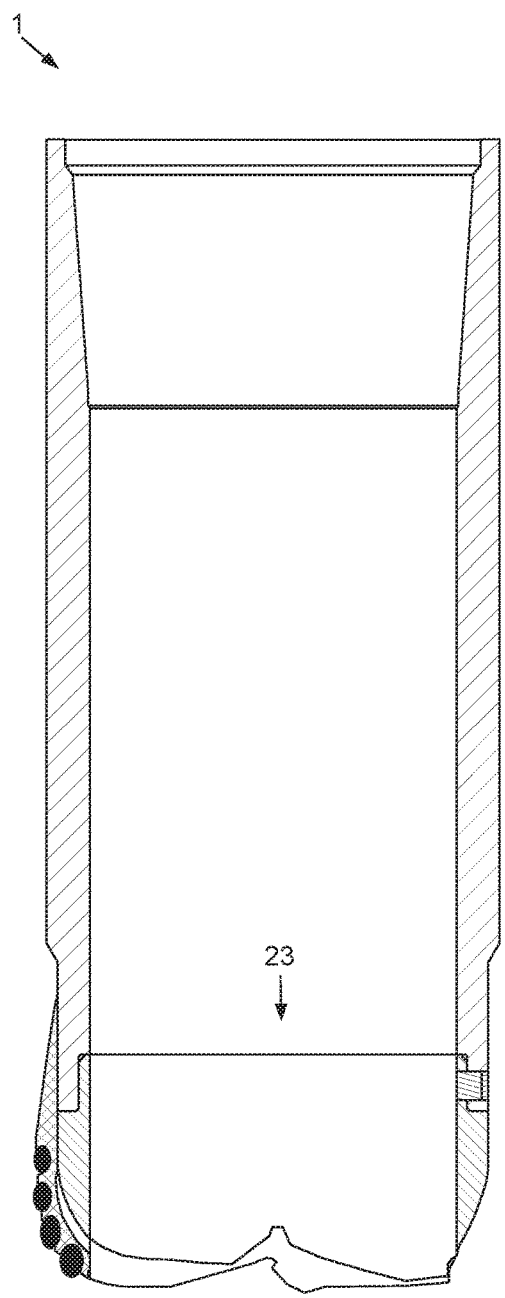
FIG. 7A illustrates drill-out of the drill bit.

FIG. 7A illustrates drill-out of the drill bit 1. A drill string (not shown) may then be deployed into the wellbore. The drill string may include a fixed cutter, such as a PDC, or a roller cone second drill bit. The drill string may be deployed into the wellbore until the second drill bit reaches the float collar of the liner string. Drilling fluid may be pumped through the drill string, the second drill bit rotated, and advanced to drill out the float collar. Advancement of the drill string may continue until the second drill bit reaches the head 1h. The taper 6t may guide the second drill bit into engagement with the head 1h. The second drill bit may drill out an inner portion 23 of the head 1h through the plenum 4 and the taper 6t. The inner portion 23 of the head 1h may also include the cone 7c and nose 7n of the cutting face. Even though a portion of the pins 21p may be drilled out, enough of the pins may remain to keep the head 1h torsionally and longitudinally connected to the stem 1s, thereby facilitating drill out by not letting the head rotate with the second drill bit. The remaining outer portion of the head 1h may further include the shoulder 8. Once the second drill bit has drilled out the head 1h, drilling of the wellbore may resume.

The drill bit 1 may be equally useful for drilling with a casing string instead of the liner string. The notable difference being that the casing string is hung from the wellhead instead of an existing casing string in the wellbore.

Alternatively, the drill bit 1 may be drilled out before cementing the casing or liner string into the wellbore.

Figure 7B:
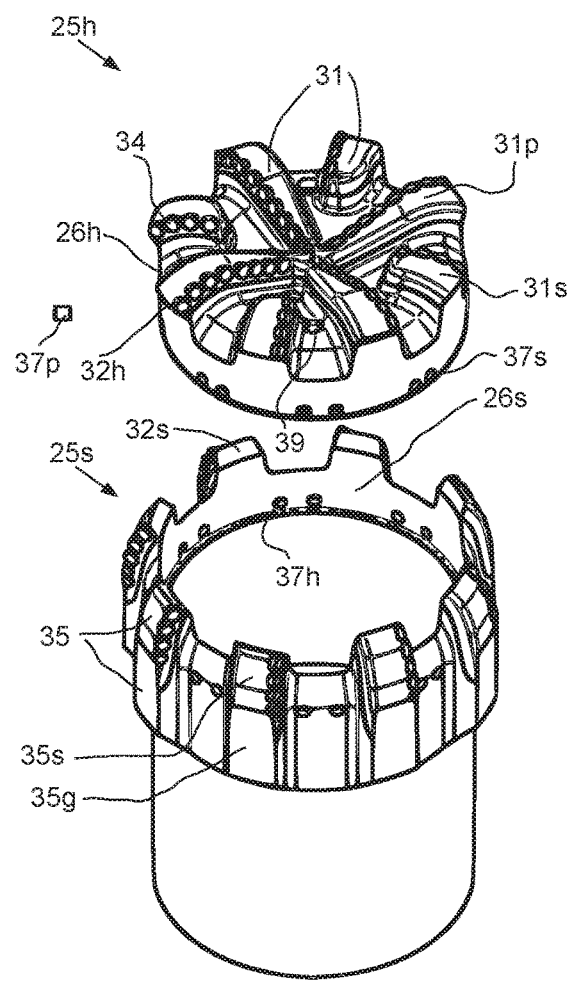
FIG. 7B illustrates assembly of a head and stem of an alternative drill bit for drilling with a casing or liner string, according to another embodiment of the present disclosure.
Figure 8A:
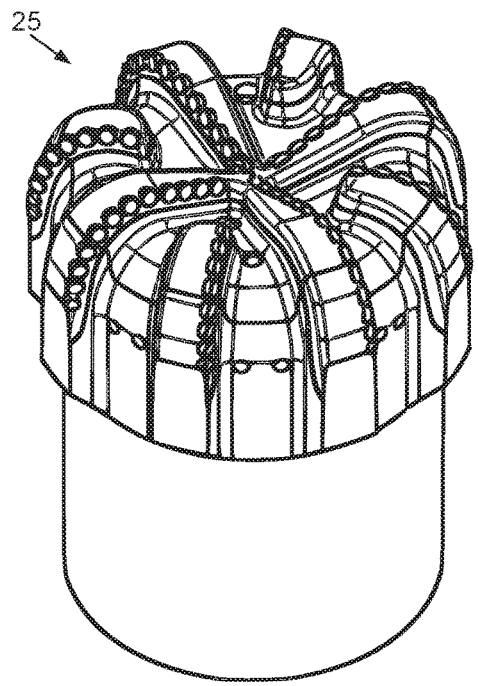
FIGS. 8A-8D illustrate the completed alternative drill bit.
Figure 8B:
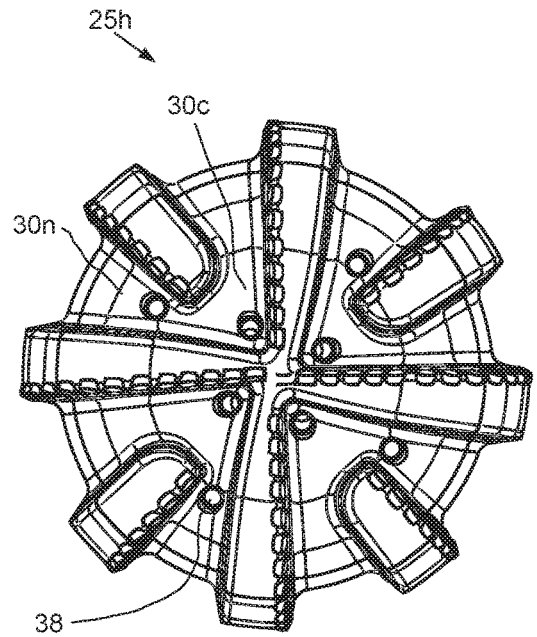

FIG. 7B illustrates assembly of a head 25h and stem 25s of an alternative drill bit 25 (FIG. 8A) for drilling with a casing or liner string, according to another embodiment of the present disclosure. Similar to the bit 1, a piece of round stock (not shown) may be received from the metalworking plant. The round stock may be made from the same material discussed above for the round stock 2. The round stock may be mounted in the lathe. The round stock may be turned in the lathe to form a lap coupling 26h in an outer surface thereof at a mounting end thereof. The round stock may be further turned in the lathe to form a plenum 27 (FIG. 8D) extending from a mounting end thereof and a threaded socket 28 (FIG. 8D) extending from the plenum. The round stock may be further turned in the lathe to form a taper 29t (FIG. 8D) in an inner surface thereof adjacent to the mounting end and a chamfer 29c (FIG. 8D) in an outer surface thereof adjacent to the mounting end. The round stock may be further turned in the lathe to form an inner cone 30c (FIG. 8B) in a cutting face thereof and an intermediate nose 30n (FIG. 8B) in the cutting face. The cutting face may be located at an end of the round stock opposite to the mounting end. The round stock with the turned features 26-30 will now be referred to as a blank.

The blank may be removed from the lathe and mounted in the mill. The mill may be operated to cut fluid courses in the cutting face of the blank, thereby forming a plurality of blades 31 between adjacent fluid courses. The mill may be further operated to drill a plurality of (eight shown) ports 39 into the blank. The ports 39 may extend from the fluid courses and to the plenum 27 of the blank.

The blades 31 may include one or more (four shown) primary blades 31p and one or more (four shown) secondary blades 31s. The blades 31 may be spaced around the cutting face and may protrude from a bottom of the head 25h. The primary blades 31p may each extend from a center of the cutting face to the nose 30n. The primary blades 31p may extend radially along the cone 30c and nose 30n. The secondary blades 31s may each radially extend from a periphery of the cone 30c and along the nose 30n. Since the blades 31 are formed integrally with the head 25h, the blades are also made from the same material as the head. The mill may be further operated to cut a row of pockets along leading edges of each blade 31p,s. For the primary blades 31p, each row of pockets may extend from the center of the cutting face to a nose end of the respective blade. For the secondary blades 31s, each row of pockets may extend from the periphery of the cone 30c to a nose end of the respective blade. The mill may be further operated to form a miter cut 32h in the nose end of each blade 31p,s.

The head 25h may be removed from the mill and delivered to the treatment station. At the treatment station, a layer of hardfacing (not shown, see FIG. 8A of U.S. Prov. Pat. App. No. 62/361,739, filed Jul. 13, 2016, which is herein incorporated by reference in its entirety) may be deposited on the blades 31 to increase resistance thereof to abrasion and/or erosion. The hardfacing may be ceramic or cermet, such as a carbide or carbide cemented by metal or alloy. The hardfacing may be deposited on a portion of a leading face, a portion of a trailing face, and a bottom surface of each blade 31p,s. The hardfaced portions of the leading and trailing faces may extend from the leading and trailing edges of each blade 31p,s to or past mid-portions thereof. The pockets may be masked from the hardfacing. The head 25h may then be transported from the treatment station to the cutter station. At the cutter station, cutters 34 may be mounted into the pockets, such as by brazing. The cutters 34 may be similar to the cutters 14.

An oilfield tubular (not shown) may be received from the manufacturing plant. The tubular may have a threaded coupling, such as a box, formed at a first longitudinal end thereof for assembly of the alternative drill bit 25 as part of a casing or liner string. The tubular may also have a collar formed in an outer surface thereof and at a second longitudinal end thereof. The collar may only extend along a portion of a length of the tubular, such as between one-tenth and one-half the length of the tubular. The tubular may be made from the same material discussed above for the tubular 15.

Figure 8C:
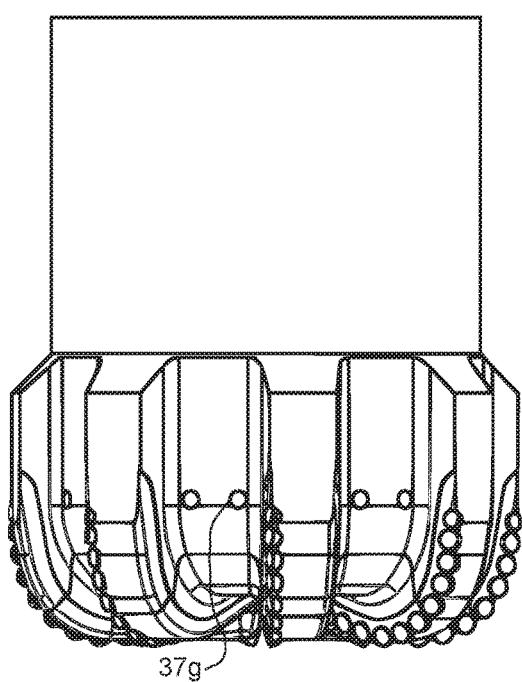
Figure 8D:
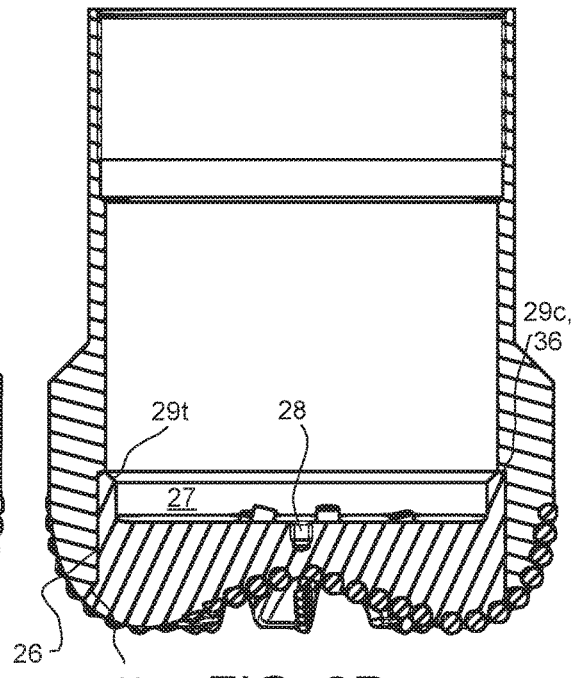

The tubular may be mounted in the lathe. The tubular may be turned in the lathe to form a lap coupling 26s in an inner surface thereof at the second end thereof. The lap coupling 26s may receive the lap coupling 26h to form a lap joint 26 (FIG. 8D). The tubular may be further turned to adjust the length of the collar.

The tubular may be removed from the lathe and mounted in the mill for forming the stem 25s therefrom. The mill may be operated to cut junk slots in the collar, thereby forming a plurality of blades 35 between adjacent junk slots. Each blade 35 may match a respective blade 31 of the head 25h and each junk slot may match a respective fluid course of the head. Each blade 35 may have a curved shoulder portion 35s and a straight gage portion 35g, thereby defining an outer shoulder of the cutting face and a gauge section of the alternative drill bit 25. The blades 35 may extend along the collar longitudinally. The mill may be further operated to cut a row of pockets along a leading edge of the shoulder portion 35s of each blade. The mill may be further operated to form a miter cut 32s in a shoulder end of each blade 35. The miter cuts 32h may receive the miter cuts 32s to form flush joints 32 (FIG. 8D). Since the blades 35 are formed integrally with the stem 25s, the blades 35 are also made from the same material as the stem.

Alternatively, the mill may be further operated to form pockets along and across the outer surface of the gauge portions 35g.

The stem 25s may be removed from the mill and delivered to the treatment station. At the treatment station, a layer of hardfacing (not shown, see FIG. 8A of the '739 Prov. App.) may be deposited on the blades 35 to increase resistance thereof to abrasion and/or erosion. The hardfacing may be ceramic or cermet, such as a carbide or carbide cemented by metal or alloy. The hardfacing may be deposited on a portion of a leading face, a portion of a trailing face, and an outer surface of each blade 35. The stem 25s may then be transported from the treatment station to the cutter station. At the cutter station, cutters 34 may be mounted into the pockets of the shoulder portions 35s, such as by brazing.

Alternatively, protectors may also be mounted in the pockets of the gauge portions 35g at the cutter station. The protectors may be made from a hard material, such as a ceramic or cermet, or a superhard material, such as diamond. The ceramic or cermet may be a carbide cemented by a metal or alloy and the diamond may be a compact or impregnated segment.

A clamp (not shown), similar to the clamp 19, may be used to facilitate the assembling process. A seal 36 (FIG. 8D), such as an o-ring, may be inserted into the lap coupling 26s of the stem 25s. The rod of the clamp may be inserted into the stem 26s and received into a hole formed through the flange of the clamp as the lap couplings 26h,s are mated and the miter cuts 32h,s are aligned. The nut of the clamp may be screwed onto an end of the threaded rod adjacent to the flange, thereby securing the head 26h into place. The seal 36 may be made from an elastomeric material and may be energized by engagement of the chamfer 29c therewith.

The clamped head 26h and stem 26s may be mounted in the mill for forming a lock joint attaching the head and the stem. The mill may be operated to drill one or more receptacles through the lap coupling 26s of the stem 25s and into the lap coupling 26h of the head 25h. A fastener, such as pin 37p, may then be inserted into each receptacle and have a portion extending into a head socket 37s of the respective receptacle and a portion extending into a stem hole 37h of the respective receptacle, thereby torsionally and longitudinally connecting the head 25h and the stem 25s. Each pin 37p may be made from the same material as the head 25h. Each receptacle may then be closed by a plug 37g (FIG. 8C) formed by welding, thereby securing the respective pin 37p into place and sealing the receptacle from leakage. The clamp may then be removed.

A grinder (not shown) may then be used to grind down an outermost cutter of each blade 35 to adjust the gauge diameter of the alternative drill bit 25. A nozzle 38 (FIG. 8B) may then be inserted into each port 39 and mounted therein, such as by adhesive. The nozzle material and adhesive may be similar to those discussed above for the nozzle 22. Each nozzle 38 may be a sleeve and have a mounting shoulder formed in an outer surface thereof for engagement with a mounting shoulder formed in the respective port 32. Each nozzle 38 may have a length greater than a thickness of the head 25h (between the plenum 27 and a bottom of the head) so that a portion of the nozzle extends into the plenum (FIG. 8D), thereby discouraging erosion thereof.

FIGS. 8A-8D illustrate the completed alternative drill bit 25. Use and drill out of the alternative drill bit 25 may be similar to those discussed above for the drill bit 1 except that essentially all of the head 25h is drilled out instead of just the inner portion 23.

Figure 9:
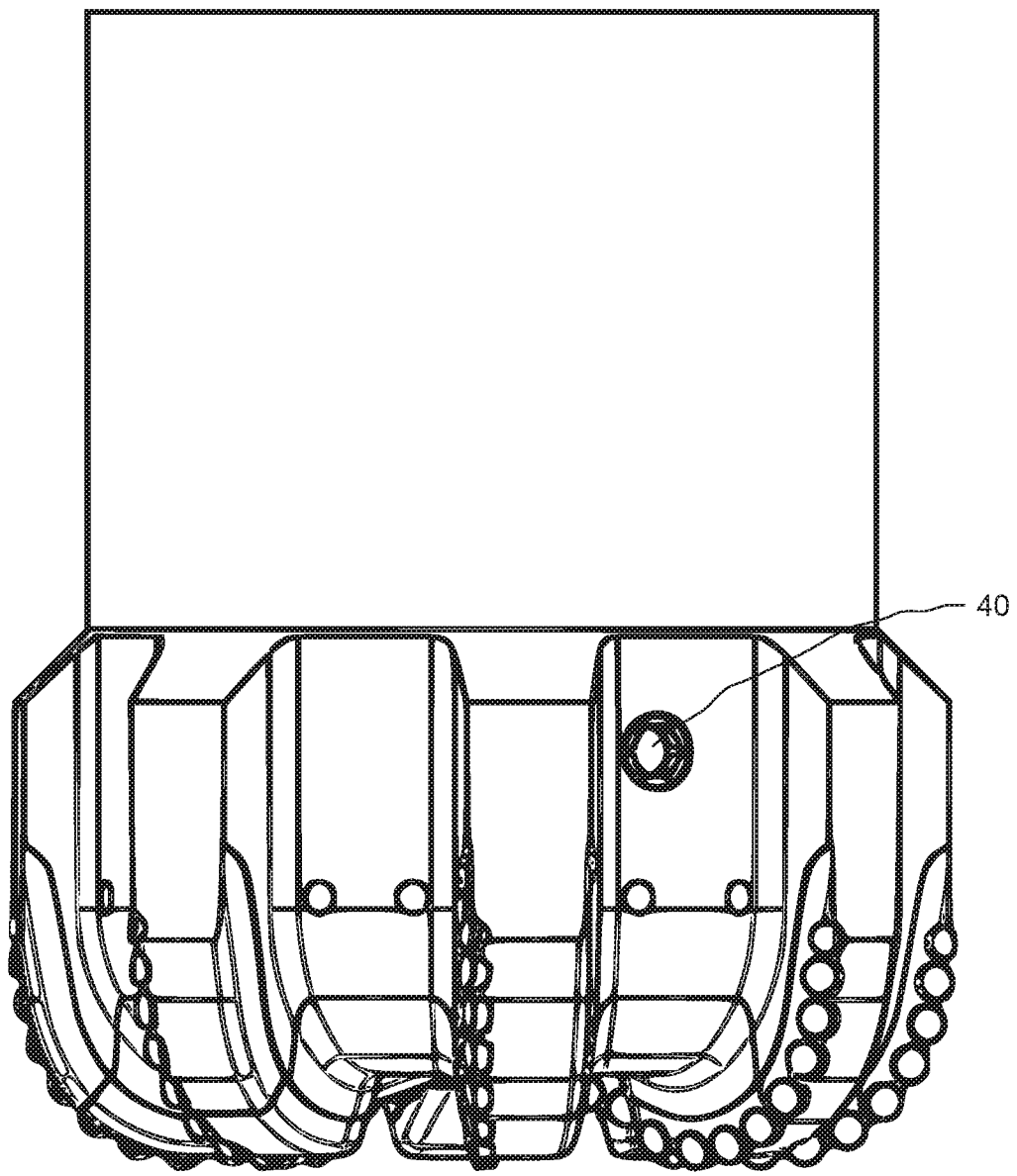
FIG. 9 illustrates a modification to the alternative drill bit, according to another embodiment of the present disclosure.

FIG. 9 illustrates a modification to the alternative drill bit 25, according to another embodiment of the present disclosure. After forming the blades 35, the mill may be further operated to drill a reserve port through a wall of the stem 26s at one of the junk slots. The reserve port may then be closed by mounting a frangible member, such as a rupture disk 40, to the modified stem. The reserve port may be utilized if the nozzles become plugged, especially during cementing of the casing or liner string. Pressure in the plenum 27 may increase until a rupture pressure is reached, thereby opening the rupture disk 40.

Alternatively, the bit 1 may also be modified to include a reserve port and rupture disk.

While the foregoing is directed to embodiments of the present disclosure, other and further embodiments of the disclosure may be devised without departing from the basic scope thereof, and the scope of the invention is determined by the claims that follow.

The invention claimed is:

1. A bit for drilling with a casing or liner string, comprising:
   a tubular stem made from a high strength metal or alloy;
   a head:
      having a cutting face with an inner cone, an outer shoulder, and an intermediate nose between the cone and the shoulder;
      attached to an end of the stem; and
      made from a nonferrous metal or alloy;
   a plurality of blades formed integrally with the head, made from the nonferrous metal or alloy, and each extending from a center of the cutting face to the shoulder;
   a plurality of superhard cutters mounted along each blade;
   a plurality of gauge pads formed integrally with the stem; and
   a flush joint formed between each blade and a respective gauge pad,
   wherein:
      a yield strength of the high strength metal or alloy is at least twice a yield strength of the nonferrous metal or alloy,
      the bit further comprises a lock joint and a lap joint attaching the head to the stem, and
      the lap joint has a lap coupling of the stem engaged with a lap coupling of the head.

2. The bit of claim 1, wherein:
   the high strength metal or alloy is steel, and
   the nonferrous metal or alloy is nickel-based.

3. The bit of claim 1, further comprising a layer of hardfacing deposited on a bottom or outer surface of each blade and an outer surface of each pad.

4. The bit of claim 1, wherein the lock joint comprises:
   a receptacle having a hole formed through the lap coupling of the stem and a socket formed into the lap coupling of the head;
   a fastener disposed in the socket and the hole; and
   a plug closing the receptacle.

5. The bit of claim 1, wherein:
   the lap coupling of the head has a chamfer formed in an outer surface thereof, and
   the bit further comprises a seal disposed between the chamfer and the lap coupling of the stem.

6. The bit of claim 1, wherein the lap coupling of the head has a taper formed in an inner surface thereof for guiding a second drill bit into the head.

7. The bit of claim 1, wherein the head further has:
   a plurality of fluid courses formed between the blades;
   a plenum formed therein; and
   a plurality of ports extending from the fluid courses and to the plenum.

8. The bit of claim 7, wherein:
   the bit further comprises a plurality of nozzles,
   each nozzle is mounted in a respective port, and
   each nozzle is made from a ceramic or cermet.

9. The bit of claim 7, wherein:
   the blades are primary blades,
   some of the ports are inner ports disposed adjacent to the center of the cutting face, and
   the bit further comprises a plurality of secondary blades each extending from a location on the cutting face adjacent to a respective inner port to the shoulder.

10. The bit of claim 1, wherein:
    each flush joint has a curved cut at a shoulder end of the respective blade and a curved cut at an end of the respective gauge pad adjacent to the shoulder end of the blade,
    the blades and pads have a slight helical curvature, and
    the curved cuts conform to the slight helical curvature.

11. The bit of claim 1, wherein:
    the stem has a reserve port formed through a wall thereof, and
    the bit further comprises a rupture disk closing the reserve port.

12. The bit of claim 1, wherein:
    the end is a lower end of the stem, and
    the bit further comprises a threaded coupling formed at an upper end of the stem for connection to the casing or liner string.

13. A method of drilling a wellbore using the bit of claim 12, comprising:
    assembling the bit as part of the casing or liner string;
    drilling the casing or liner string into the wellbore to extend the wellbore through a problem formation;
    cementing the casing or liner string into the wellbore; and
    drilling out an inner portion of the head with a polycrystalline diamond compact or roller cone second drill bit,
    wherein an outer portion of the head remains after drill-out.

14. A method of drilling a wellbore, comprising:
    assembling a bit as part of a casing or liner string, the bit comprising:
       a tubular stem made from a high strength metal or alloy;
       a head:
          having a cutting face with an inner cone, an outer shoulder, and an intermediate nose between the cone and the shoulder;
          attached to an end of the stem; and
          made from a nonferrous metal or alloy;
       a plurality of blades formed integrally with the head, made from the nonferrous metal or alloy, and each extending from a center of the cutting face to the shoulder;
       a plurality of superhard cutters mounted along each blade;
       a plurality of gauge pads formed integrally with the stem; and
       a flush joint formed between each blade and a respective gauge pad, wherein:
   a yield strength of the high strength metal or alloy is at least twice a yield strength of the nonferrous metal or alloy,
   the end is a lower end of the stem,
   the bit further comprises a threaded coupling formed at an upper end of the stem for connection to the casing or liner string,
   the bit further comprises a lock joint and a lap joint attaching the head to the stem, and
   an outer portion of the head includes an essential portion of the lock joint;
drilling the casing or liner string into the wellbore to extend the wellbore through a problem formation;
cementing the casing or liner string into the wellbore; and
drilling out an inner portion of the head with a polycrystalline diamond compact or roller cone second drill bit,
wherein the outer portion of the head remains after drill-out.

15. A bit for drilling with a casing or liner string, comprising:
- a head having a cutting face with an inner cone and an intermediate nose and made from a nonferrous metal or alloy;
- a tubular stem attached to the head, having an outer shoulder of the cutting face, and made from a high strength metal or alloy;
- a plurality of first blades formed integrally with the head, made from the nonferrous metal or alloy, and each extending from a center of the cutting face to the nose;
- a plurality of superhard cutters mounted along each first blade;
- a plurality of second blades formed integrally with the stem, made from the high strength metal or alloy, and each having a curved shoulder portion and a gage portion;
- a plurality of superhard cutters mounted along each shoulder portion; and
- a flush joint formed between each first and second blade, wherein:
   a yield strength of the high strength metal or alloy is at least twice a yield strength of the nonferrous metal or alloy,
   the bit further comprises a lock joint and a lap joint attaching the head to the stem, and
   the lap joint has a lap coupling of the stem engaged with a lap coupling of the head.

16. The bit of claim 15, wherein the lock joint comprises:
- a receptacle having a hole formed through the lap coupling of the stem and a socket formed into the lap coupling of the head;
- a fastener disposed in the socket and the hole; and
- a plug closing the receptacle.

17. The bit of claim 15, wherein:
the lap coupling of the head has a chamfer formed in an outer surface thereof, and
the bit further comprises a seal disposed between the chamfer and the lap coupling of the stem.

18. The bit of claim 15, wherein the lap coupling of the head has a taper formed in an inner surface thereof for guiding a second drill bit into the head.

19. The bit of claim 15, wherein each flush joint has a miter cut at a nose end of the respective first blade and a miter cut at a shoulder end of the respective second blade.

20. A method of drilling a wellbore using the bit of claim 15, comprising:
assembling the bit as part of the casing or liner string;
drilling the casing or liner string into the wellbore to extend the wellbore through a problem formation;
cementing the casing or liner string into the wellbore; and
drilling out the head with a polycrystalline diamond compact or roller cone second drill bit.

* * * * *